Feb. 28, 1933.  G. H. STERLING  1,899,597
DRAFT OR COUPLING DEVICE
Original Filed Sept. 9, 1929
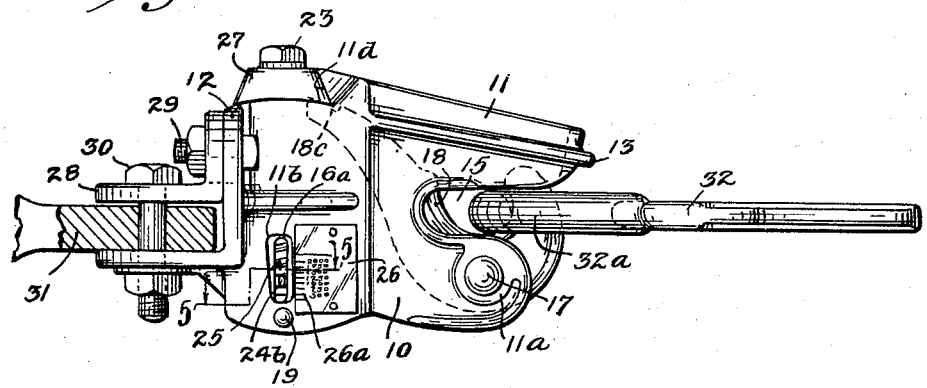
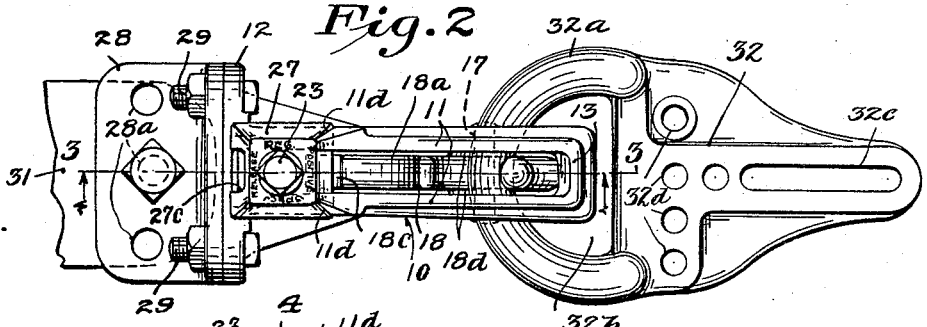
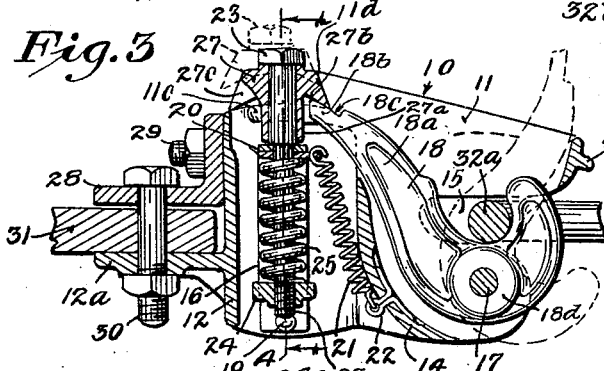
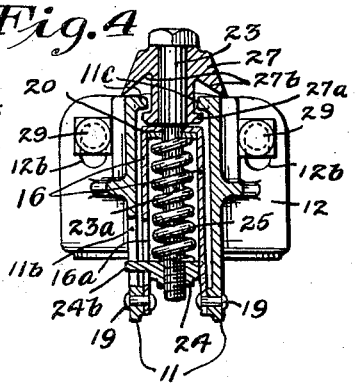
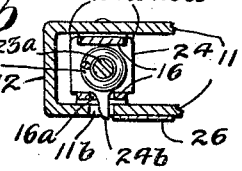
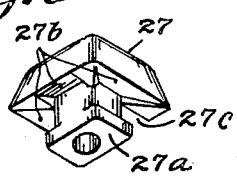
Inventor
George H. Sterling
By his Attorneys
Williamson
Reif & Williamson Patented Feb. 28, 1933

1,899,597

UNITED STATES PATENT OFFICE

GEORGE H. STERLING, OF GLENWOOD, MINNESOTA

DRAFT OR COUPLING DEVICE

Application filed September 9, 1929, Serial No. 391,148. Renewed July 25, 1932.

This invention relates to a draft device and particularly to a hitch or coupling of the type used to draw various vehicles and such as used to connect a tractor with some other member which is drawn thereby. Such devices are now commonly used to connect tractors to other vehicles and to plows and other agricultural implements. It is desirable at times to have a positive coupling device and it is desirable at other times to have a releasable coupling which will uncouple and be released when a certain stress is placed thereon. It is also desirable to have a hitch which will automatically couple when engaged by the coupling member. A coupling or draft device of this general type is shown in the patent to Sagen, No. 1,540,426, granted on June 2, 1925, on which device the present invention is an improvement.

It is an object of this invention, therefore, to provide a coupling device which can be converted into either a positive or a releasable coupling and one which has a member movable substantially vertically when the coupling releases and which is movable rearwardly to permit automatic coupling of the device.

It is a further object of the invention to provide a draft device comprising a casing, a pivoted latch therein and a member engaged by said latch for holding the latch in operative position, said member being rotatable to different positions and being adapted to be engaged with said casing to prevent movement of said latch.

It is more specifically an object of the invention to provide a draft device or coupling comprising a narrow casing, a latch pivoted therein at its forward portion, a yoke pivoted in said casing in the rear of said latch, having therein a resilient means, a member on top of said casing connected to said resilient means and rotatable to a plurality of positions in one of which it is locked to the casing and in others of which it is movable against said resilient means by stress placed on said latch, a spring also being provided for holding said yoke in proper position.

These and other objects and advantages of the invention will be fully set forth in the following description made in connection with the accompanying drawing, in which like reference characters refer to similar parts throughout the several views, and in which:—

Fig. 1 is a view in side elevation of the draft device, the traction member being shown partly in vertical section;

Fig. 2 is a plan view of the device;

Fig. 3 is a vertical section taken substantially on line 3—3 of Fig. 2;

Fig. 4 is a vertical section taken on line 4—4 of Fig. 3 as indicated by the arrows;

Fig. 5 is a horizontal section taken on line 5—5 of Fig. 1 as indicated by the arrows, and Fig. 6 is a perspective view of the latch-engaging member used.

Referring to the drawing, the device comprises a comparatively narrow casing designated generally as 10. While this casing might be of various forms, in the embodiment of the invention illustrated it is shown as having side walls 11, a rear wall 12, a substantially rectangular yoke-like portion 13 at its upper forward end and an intermediate partition 14. The side walls 11 have horizontal slots 15 extending thereinto from the forward end thereof, the portion below the slots having a rounded front end and having formed at the outer sides thereof bosses 11a. A pivot member 17 in the form of a rivet or bolt extends through bores in the bosses 11a and forms a pivot on which swings a latch 18. Said latch 18 is generally in the form of a hook with the pivot 17 disposed substantially centrally of its hook portion, and the same has a rearwardly extending portion 18a shouldered at its end to form a terminal portion or tongue 18b with a substantially flat surface 18c at its upper side. Latch 18 is disposed between the side walls 11 and has bosses 18d at its sides engaging the inner side of said walls, rivet 17 extending centrally of said bosses 18d. A yoke 16 having vertically extending parallel walls and a substantially horizontal top wall connecting the same is disposed in casing 10 between rear wall 12 and partition 14 and is pivoted at its bottom to said casing by suitable pivots, such as the rivets 19. A washer plate 20 is disposed beneath the top of said yoke and has an apertured projection at the forward portion of said yoke enaged by one end of a tensile coiled spring 21, which spring extends downwardly and forwardly and has its other end secured to a cotter pin 22 inserted in an aperture in partition 14, the spread ends of said pin lying in slots in the forward wall of partition 14. A headed bolt 23 has a shoulder-forming reduced portion 23a extending through the top of yoke 16 and washer plate 20, said reduced portion being threaded at its lower end to receive a nut 24 adapted to slide between the walls of yoke 16 and having projections 24a at one side embracing the sides of said yoke. A coiled compression spring 25 surrounds portion 23a of bolt 23 and is disposed between nut 24 and the top of yoke 16. Yoke 16 has a vertically extending slot 16a in one side thereof aligned with a slot 11b in one of the side walls 11 of casing 10 and nut 24 has an indicating pointer 24b formed thereon extending through said slots and adapted to cooperate with numbered graduations 26a on a plate 26 secured to one of the side walls 11 adjacent slot 11b. A member 27 is rotatably mounted on bolt 23 at its upper larger portion and beneath the head of said bolt. Member 27 is generally in the form of a frustum of a pyramid and has projecting downwardly from its under surface centrally thereof an elongated T head 27a. It will thus be seen that the sides of member 27 have their exterior surfaces sloping downwardly and outwardly and said member is provided with three distinct under surfaces 27b which slope downwardly and outwardly and intersect the side surfaces at quite a sharp angle, as shown in Figs. 3, 4 and 6. The surfaces 27b at opposite sides of member 27 are disposed at different angles to the horizontal. At the side opposite the middle surface 27b, member 27 is provided with a slot 27c, for a purpose to be later described. The side walls 11 have inwardly extending flanges 11c above yoke 16 and when the T head 27a of member 27 has its long axis extending transversely of side walls 11, the sides of said T are beneath the flanges 11c as shown in Fig. 4 so that member 27 cannot be lifted out of casing 10. The rear wall 12 of casing 10 has a rearwardly extending flange 12a of rectangular form extending thereacross and an angle plate 28 is bolted to the rear wall 12 above flange 12a by headed and nutted bolts 29. Bolts 29 pass through vertically extending elongated slots 12b in the rear wall 12 so that plate 28 may be secured in different positions. The horizontal portions of plate 28 and flange 12a are provided with a plurality of vertically extending aligned holes 28a through any one of which a headed and nuted bolt 30 is adapted to pass, the same extending through an aperture in the draw bar or tractor member 31 disposed between flange 12a and plate 28. It will be noted that casing 10 has V shaped recesses 11d at its top formed by the rearwardly projecting pointed ends of side walls 11. The angle of these recesses is substantially the same as the angle between the sides and bottom of the edge of member 27 so that said member fits in said recesses as shown in Figs. 1 and 3. A coupling member or clevis 32 is provided having a semi-circular portion 32a substantially circular in cross section and enclosing a semi-circular space 32b through which the end of hook or latch 18 extends. Member 32 has a comparatively flat forward portion through which extends a vertical slot 32c and a plurality of vertical holes 32d, said slot and holes being adapted to receive a bolt attaching member 32 to the device to be drawn.

In operation the device will be connected to the traction member 31 as shown, bolt 30 passing through the desired one of the holes 28a. If the latch 18 is not secured to member 32 as shown in the full line positions in Fig. 1 to 3, and it is desired to automatically connect the hitch, latch 18 will be swung forward as shown in dotted lines in Fig. 3. The hitch will now be moved toward member 32 as the hitch is usually carried by the tractor and member 32 will be led into the slots 15. The end of the portion 32a will strike latch 18 above pivot 17 and end 18a of latch 18 will be swung or pushed rearwardly. As the terminal end 18b swings downwardly it will strike one of the exterior sides of member 27. This will tend to push member 27 forwardly and said member will swing forwardly carrying with it bolt 23 and yoke 16, the latter swinging about pivots 19 and spring 21 being extended. When the end of member 18 swings past the edge of member 27 the parts will be stopped and spring 21 will swing yoke 16, the bolt 23 and member 27 forwardly so that the terminal end 18b of the latch 18 will be disposed under one of the sides of member 27 with surface 18c engaging one of the surfaces 27b. When member 27 is in this position the narrow side of its T head 27 also extends transversely of the casing walls 11 and member 27 can move vertically between flanges 11c. The latch is now in the position shown in full lines in Figs. 1 and 3, coupled to member 32 and is ready to pull the member which is to be drawn. If sufficient tension is placed on latch 18 by member 32, said latch will swing about pivot 17 and lift member 27, surface 18c acting as a cam against one of the surfaces 27b. Member 27 will be forced upwardly and slightly forwardly as indicated by the dotted lines in Fig. 3, the same raising bolt 23 and nut 24 and compressing spring 25. Latch 18 will move from beneath the edge of member 27 and be released. Nut 24 can be adjusted to place spring 25 under different degrees of tension so that latch 18 will release at different tensions or degrees of pulling force. The pointer 24b will indicate the force measured in pounds at which the latch will release, this being indicated by the numbered graduations 26a. One of the surfaces 27b at opposite sides of member 27 is thus engaged when said indications 26a are used. The opposite surface 27b has a little steeper angle and requires somewhat greater force to be cammed up by surface 18c. This is called the "special" position of the hitch or of member 27. As shown in Fig. 2 the top of member 27 bears four designations, namely "Reg" meaning the regular position with one of the opposite surfaces 27b engaging surface 18c. In this position the graduations 26a are used. Opposite the designation "Reg" is the designation "Spec" meaning special and when in this position a greater force will be needed to release the hitch than indicated on the graduations 26a. At another part of member 27 is the word "Positive". When in this position the head 27a is disposed as shown in Fig. 4 and member 27 cannot be lifted by the tongue 18b of the latch 18 as the sides of the T head will engage flanges 11c. The hitch is thus positively connected and cannot release under tension.

The side of member 27 opposite that carrying the word "Positive" is designated "Release". This is the side having the slot 27c therein and the end 18b of latch 18 can swing freely through this slot and when this slot is disposed forwardly latch 18 is always released. The spring 21 is a much lighter spring than spring 25 and very little force is needed to swing members 16, 23, 25 and 27 forwardly when latch 18 is automatically coupled to member 32.

From the above description it is seen that applicant has provided a simple and efficient draft device or hitch. The parts of the device are comparatively few and the whole device is quite simple and compact and forms a very practical and marketable hitch. The same has been amply demonstrated in actual practice and is being commercially marketed.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A draft device comprising a casing, a latch pivoted at one end thereof, a member mounted to align and engage with said latch, said member being movable in two directions to move out of engagement with said latch, said member being rotatable to different positions relatively to said latch and having means when in one position, disposed to engage said casing and be locked against movement in one of said directions thus locking said latch and resilient means resisting movement of said member when in another position for permitting said latch to cause said member to move in said direction and release said latch.

2. A draft device comprising, a casing, a latch pivoted at one end thereof, a member mounted to align and engage with said latch, said member movable out of engagement with said latch, said member being rotatable to three positions relatively to said latch and having means when in one position disposed to engage said casing and to prevent movement of said member out of engagement with said latch thus locking said latch and having surfaces for alternately engaging said latch when in its other two positions, and resilient means resisting movement of said member and latch when in said latter two positions, said surfaces being differently disposed relatively to said latch.

3. A draft device comprising a narrow casing, a latch mounted for forward and rearward swinging movement at the forward portion of said casing, said latch having a rearwardly projecting free end, a yoke pivoted at its lower end to said casing in the rear of said latch, a compression spring disposed in said yoke, a tensile spring connected to said yoke and adapted to move the same toward said latch, a member extending through said yoke and compression spring having a nut threaded on its lower end engaging said compression spring and a latch-engaging member rotatably mounted on the upper end of said member, said latch-engaging member resting on the top of said casing and having a plurality of downwardly inclined sides any one of which may be engaged by said latch when swinging rearwardly to move said yoke and said members rearwardly to permit automatic coupling of said latch, said latch-engaging member having a lower portion adapted when in one position to engage said casing and prevent removal of said latch-engaging member from said casing and having under surfaces alternately arranged to be engaged by said latch when said member is in other positions whereby said latch can raise said member against the tension of said compression spring and release said latch.

4. The structure set forth in claim 3, said casing having at its top a recess in which one side of said latch-engaging member fits.

5. A draft device comprising a casing, a hook-like latch mounted for forward and rearward swinging movement at the forward portion of said casing, said latch having a rearwardly projecting free end, a latch-engaging member disposed at the top of said casing, resilient means holding said member in normal position, said latch-engaging member having a plurality of downwardly and outwardly inclined sides, and having a plurality of downwardly and outwardly inclined under surfaces and having a downwardly extending portion adapted when in a certain position to engage with said casing.

6. The structure set forth in claim 5, said latch-engaging member having a slot at one side through which said latch can freely swing and said downwardly extending portion of said latch being in the form of a T head.

7. A draft device comprising a casing, a latch pivoted at one end thereof, a member mounted to align and engage with said latch, said member being movable out of engagement with said latch, said member being rotatable to four positions relative to said latch, and having means when in one position disposed to engage said casing and to prevent movement of said member out of engagement with said latch, thus locking said latch, said member having two surfaces, for alternately engaging said latch when rotated to two other positions, said two surfaces being adapted for alternate engagement with said latch, resilient means resisting movement of said member and latch when in said latter two positions, said surfaces being differently disposed relative to said latch and said member, and said member when rotated to its fourth position having no portion engaging said latch so that said latch can swing freely.

In testimony whereof I affix my signature.

GEORGE H. STERLING.